(12) United States Patent
Chirrey et al.

(10) Patent No.: US 10,427,652 B2
(45) Date of Patent: Oct. 1, 2019

(54) STEERING AXLE KINGPIN REMOVAL SYSTEM

(71) Applicant: Stemco Products, Inc., Charlotte, NC (US)

(72) Inventors: William Chirrey, Woodstock (CA); Paul Dolan, Clio, MI (US); Eric Downing, Bay City, MI (US); Thor David Sabgash, Millington, MI (US); David Osowski, Brighton, MI (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 16/023,847

(22) Filed: Jun. 29, 2018

(65) Prior Publication Data

US 2018/0304867 A1    Oct. 25, 2018

Related U.S. Application Data

(63) Continuation-in-part of application No. 15/802,050, filed on Nov. 2, 2017.
(Continued)

(51) Int. Cl.
*B60S 5/00* (2006.01)
*B62D 7/18* (2006.01)
(Continued)

(52) U.S. Cl.
CPC ............... *B60S 5/00* (2013.01); *B62B 3/104* (2013.01); *B62D 7/18* (2013.01); *B62D 65/12* (2013.01); *B62B 2202/48* (2013.01)

(58) Field of Classification Search
CPC ....... B60S 5/00; B62B 3/104; B62B 2202/48; B62D 7/18; B62D 65/12
(Continued)

(56) References Cited

U.S. PATENT DOCUMENTS 1,964,119 A    6/1934  Hendry
2,558,535 A    6/1951  Billings
(Continued)

FOREIGN PATENT DOCUMENTS

DE    202013101671 U1    5/2013

OTHER PUBLICATIONS

Stemco QuikeXtract (TM) in Two Minutes. (Stemco) Jun. 15, 2017. Accessed on Sep. 17, 2018. https://www.youtube.com/watch?v=_XSUK1hidBA (Year: 2017).*
(Continued)

*Primary Examiner* — Joseph M Rocca
*Assistant Examiner* — Hilary L Johns
(74) *Attorney, Agent, or Firm* — Perkins Coie LLP

(57) ABSTRACT

A kingpin removal system including a cart assembly having one or more wheels and a yoke assembly carried by the cart assembly and positionable around a steering spindle of a vehicle's wheel end assembly. The yoke assembly can include a pair of plates interconnected by a pair of rods. An intermediate plate is positioned between the pair of yoke plates. A wheel end support mechanism can be carried by the cart assembly and a hub mounting ring can be carried by the wheel end support mechanism. The hub mounting ring can be positioned to connect to and support the wheel end assembly once the kingpin is removed.

10 Claims, 12 Drawing Sheets

Related U.S. Application Data

(60) Provisional application No. 62/418,147, filed on Nov. 4, 2016.

(51) Int. Cl.
  *B62B 3/10* (2006.01)
  *B62D 65/12* (2006.01)

(58) Field of Classification Search
  USPC ........................................................ 280/79.4
  See application file for complete search history.

(56) References Cited

U.S. PATENT DOCUMENTS

| | | | |
|---|---|---|---|
| 3,749,265 A | 7/1973 | Smith, Jr. |
| 3,830,387 A | 8/1974 | Virnig |
| 4,050,597 A | 9/1977 | Hawkins |
| 4,166,583 A | 9/1979 | Ruckstuhl |
| 4,239,196 A | 12/1980 | Hanger |
| 4,401,405 A | 8/1983 | Ealet |
| 4,571,142 A | 2/1986 | Niewald et al. |
| 4,705,564 A | 11/1987 | Noding |
| 4,872,694 A | 10/1989 | Griesinger |
| 4,898,310 A | 2/1990 | Remington |
| 5,362,194 A | 11/1994 | Kassebaum |
| 5,378,004 A | 1/1995 | Gunlock et al. |
| 5,433,469 A | 7/1995 | Cassels |
| 5,618,228 A | 4/1997 | Anderson |
| 5,820,330 A | 10/1998 | Focke et al. |
| 5,950,262 A | 9/1999 | Smoler et al. |
| 6,106,214 A | 8/2000 | Saffelle |
| 6,382,644 B1 | 5/2002 | Rawlings |
| 6,851,684 B2 | 2/2005 | Krumm et al. |
| 6,863,488 B2 | 3/2005 | Chopra |
| 7,334,804 B2 | 2/2008 | Mitchell et al. |
| 7,611,126 B2 | 11/2009 | Vesa |
| 7,635,134 B2 | 12/2009 | Hedley et al. |
| 7,677,582 B2 | 3/2010 | Hedley et al. |
| 2014/0345104 A1 | 11/2014 | Andrews et al. |
| 2017/0232528 A1 | 8/2017 | Dolan et al. |

OTHER PUBLICATIONS

On dingil presi aks pim sökme takma presi-werner weitner king pin press. (Ostimostim) Accessed on Sep. 17, 2018. https://www.youtube.com/watch?v=3ar5z28_UDc (Year: 2011).*

Chirrey, Bill, "Steering Kingpin Repair System", Mar. 22, 2015, available at <https://www.youtube.com/watch?v=lVkV-kMqnS0>.

Ostimostim, "On dingil presi aks pim sokme takma presi-werner weitner kin pin press", Jan. 8, 2011, available at <https://www.youtube.com/watch?v=3ar5z28_UDc>.

Arihetrainc, "KPP-143 Heavy-Duty King Pin Press", Jul. 11, 2013, available at <https://www.youtube.com/watch?v=zGMdWUr4IA>.

International Search Report and Written Opinion issued in PCT Application No. PCT/US2017/059728, dated Mar. 26, 2018, 8 pages.

\* cited by examiner

US 10,427,652 B2

STEERING AXLE KINGPIN REMOVAL SYSTEM

CROSS-REFERENCE TO RELATED APPLICATION

This application is a continuation-in-part of U.S. patent application Ser. No. 15/802,050, filed Nov. 2, 2017, which claims the benefit of and priority to U.S. patent application Ser. No. 62/418,147, filed Nov. 4, 2016, the disclosures of which are incorporated herein by reference in their entireties.

TECHNICAL FIELD

The present technology is generally directed to automotive repair equipment. More specifically, embodiments are directed to steering axle kingpin removal systems.

BACKGROUND

The wheels of a heavy truck are mounted on either end of an axle. In order to steer the vehicle, the wheels are articulated so that they can rotate with respect to the ends of the axle. The pivot that allows the wheels to rotate is called a kingpin. Although a kingpin type steering system is a rugged design that is used on heavy trucks such as semitractor trailers, the kingpin and upper and lower spindle bores are susceptible to wear. Distortion of the spindle bores and/or a worn kingpin may cause the steering system to develop unwanted play resulting in loss of steering control and difficulty maintaining wheel alignment. Spindle bores may be repaired by removing and replacing the kingpin and/or machining both the upper and lower bores to accommodate oversized bushings. However, traditional spindle repair techniques entail disassembling the wheel end assembly and then removing the spindle from the vehicle before making necessary repairs.

BRIEF DESCRIPTION OF THE DRAWINGS

Embodiments of the steering axle kingpin removal systems described herein may be better understood by referring to the following Detailed Description in conjunction with the accompanying drawings, in which like reference numerals indicate identical or functionally similar elements.

Figure 1:
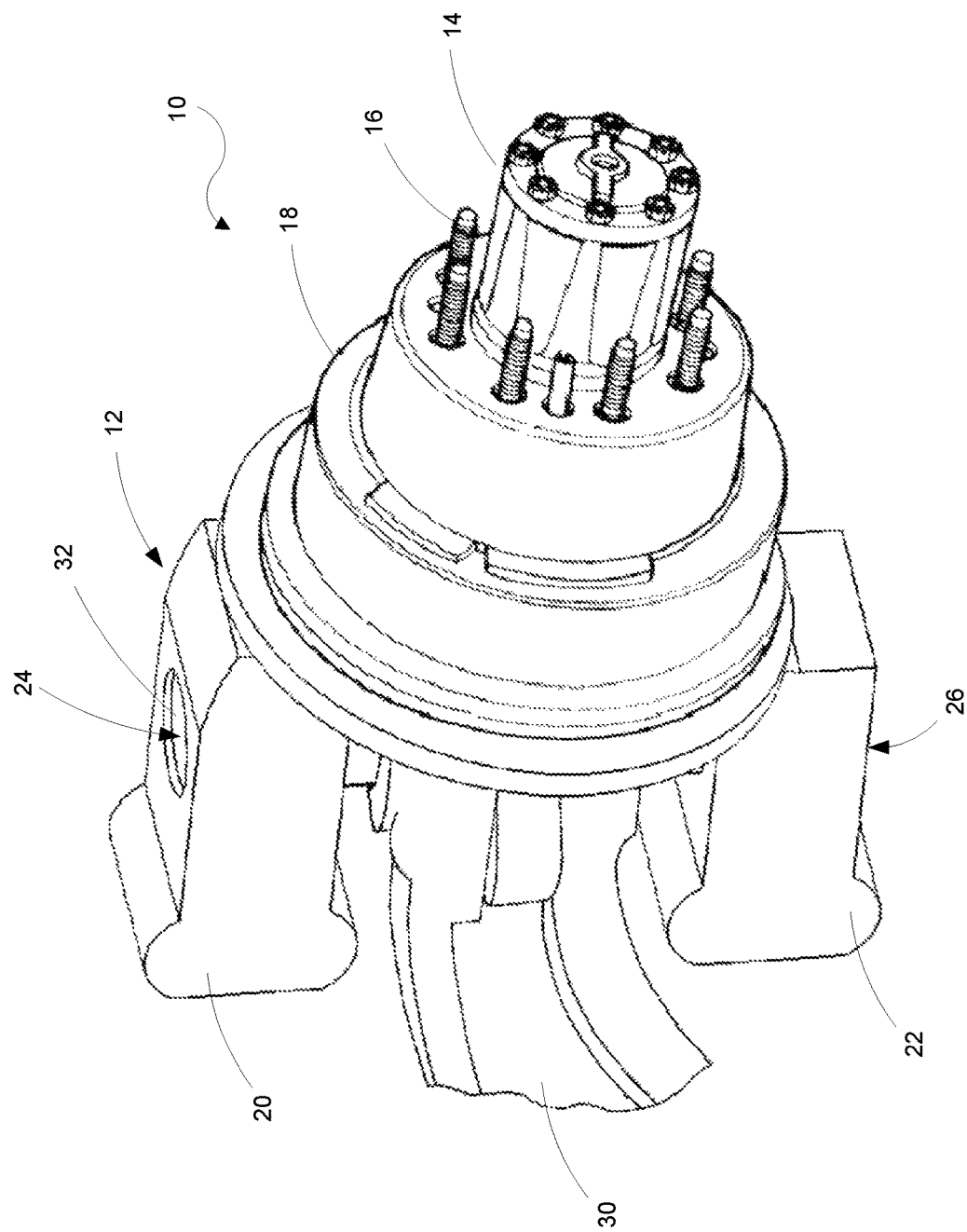
FIG. 1 is a perspective view of a representative steering axle.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives falling within the scope of the embodiments as defined by the appended claims.

DETAILED DESCRIPTION

Overview

Existing kingpin removal tools only address removal of the kingpin itself. They have no provision to support the weight of the wheel end assembly, thereby necessitating the disassembly of the wheel end components prior to removing the kingpin. Disassembly of the wheel end assembly takes time and adds cost to the repair. The steering axle kingpin removal systems disclosed herein provide a low cost, reliable method of removing the kingpin from a steer axle. The disclosed systems are designed to carry the weight of the wheel end assembly once it is free from the axle, thereby eliminating the need to disassemble the wheel end assembly.

General Description

Various examples of the device and systems introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 is illustrative of a typical wheel end assembly 10. The wheel end assembly 10 includes a kingpin type steering spindle 12. A steering spindle may also be referred to as a steering knuckle or simply a spindle. Steering spindle 12 includes a wheel spindle or axle (not shown) to which a wheel hub 14, wheel studs 16, a brake drum 18, brake shoes, bearings, seals, a wheel nut, and a wheel (not shown) are attached. The wheel spindle is connected to upper and lower spindle arms 20 and 22, respectively. Each spindle arm includes a spindle bore. For example, the upper spindle arm 20 includes an upper spindle bore 24 and the lower spindle arm 22 includes a lower spindle bore 26. The steering spindle 12 attaches to an axle 30 with a kingpin 32 extending through the upper and lower spindle bores 24 and 26. The steering spindle 12 pivots about the kingpin 32 such that the wheel can be turned in order to steer the vehicle. Each spindle bore 24/26 typically includes a bushing (not shown) to facilitate movement of the steering spindle 12 with respect to the kingpin 32.

Figure 2:
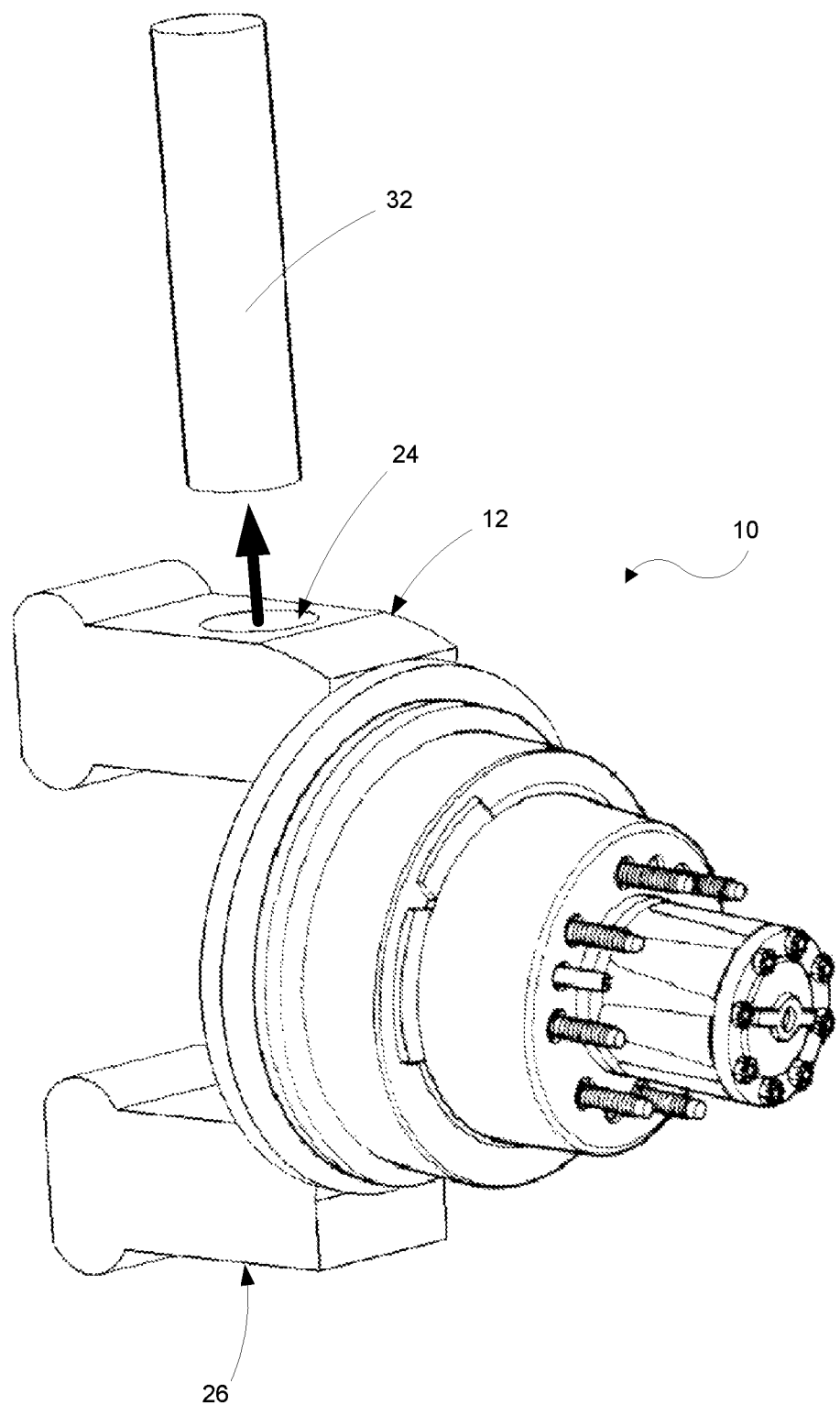
FIG. 2 is a perspective view of the steering axle shown in FIG. 1 with the kingpin removed.

Although a kingpin type steering system is a rugged design, which is used on heavy trucks such as heavy-duty pick-up trucks and semi-tractor trailers, the kingpin 32 can wear and the upper and lower spindle bores 24 and 26 may become obround or oversized such that the steering system develops unwanted play. In order to provide accurate steering and to minimize tire wear, it is important to maintain appropriate clearances between the kingpin 32 and the spindle bores 24/26. Typically, once the kingpin 32 has approximately 0.010 inches (0.254 mm) of wear between it and the spindle bushing, the axle should be rebuilt. Rebuilding the assembly requires removal of the kingpin 32 from the axle 30. The kingpin 32 is typically held in the axle 30 by one or more taper lock pins (not shown). Once these are removed, it is then possible to push (e.g., press) the kingpin from below, up and out of the spindle as shown in FIG. 2. However, in many cases the components are worn and corroded, thus requiring significant force to remove. A hydraulic press may be used to facilitate removal of the kingpin from the axle and spindle bores.

The components of the wheel end assembly 10 attached to the steering spindle 12 (e.g., wheel hub 14, wheel studs 16, brake drum 18, bearings, seals, and wheel nut) represents a significant amount of weight that would ordinarily need to be disassembled and removed from the steering spindle 12 before the kingpin 32 can be removed. Otherwise, the weight of the wheel end assembly 10 makes pressing the kingpin 32 more difficult and the weight of the wheel end assembly 10 must be supported by the technician performing the axle rebuild. In addition, disassembly of the wheel end assembly 10 is a costly and time consuming procedure. Furthermore, the wheel nut secures the wheel to the axle and must be properly preloaded for safe reliable bearing function. Proper preloading is also necessary for correct suspension alignment and tire life. Due to the significance of proper wheel nut installation, in some regions a technician must have specialized training and certification in order to install the wheel nut. Accordingly, it would be desirable to perform the kingpin replacement without the need to disassemble the wheel end assembly 10.

Existing kingpin removal tools only address removal of the kingpin itself. They have no provision to support the weight of the wheel end assembly 10, thereby necessitating the disassembly of the wheel end components. Disassembly of the wheel end assembly 10 takes time and adds cost to the repair. In addition, disassembly requires the repair facility to bear the responsibility for assuring that the wheel nut has been properly installed at the completion of the repair.

Figure 3:
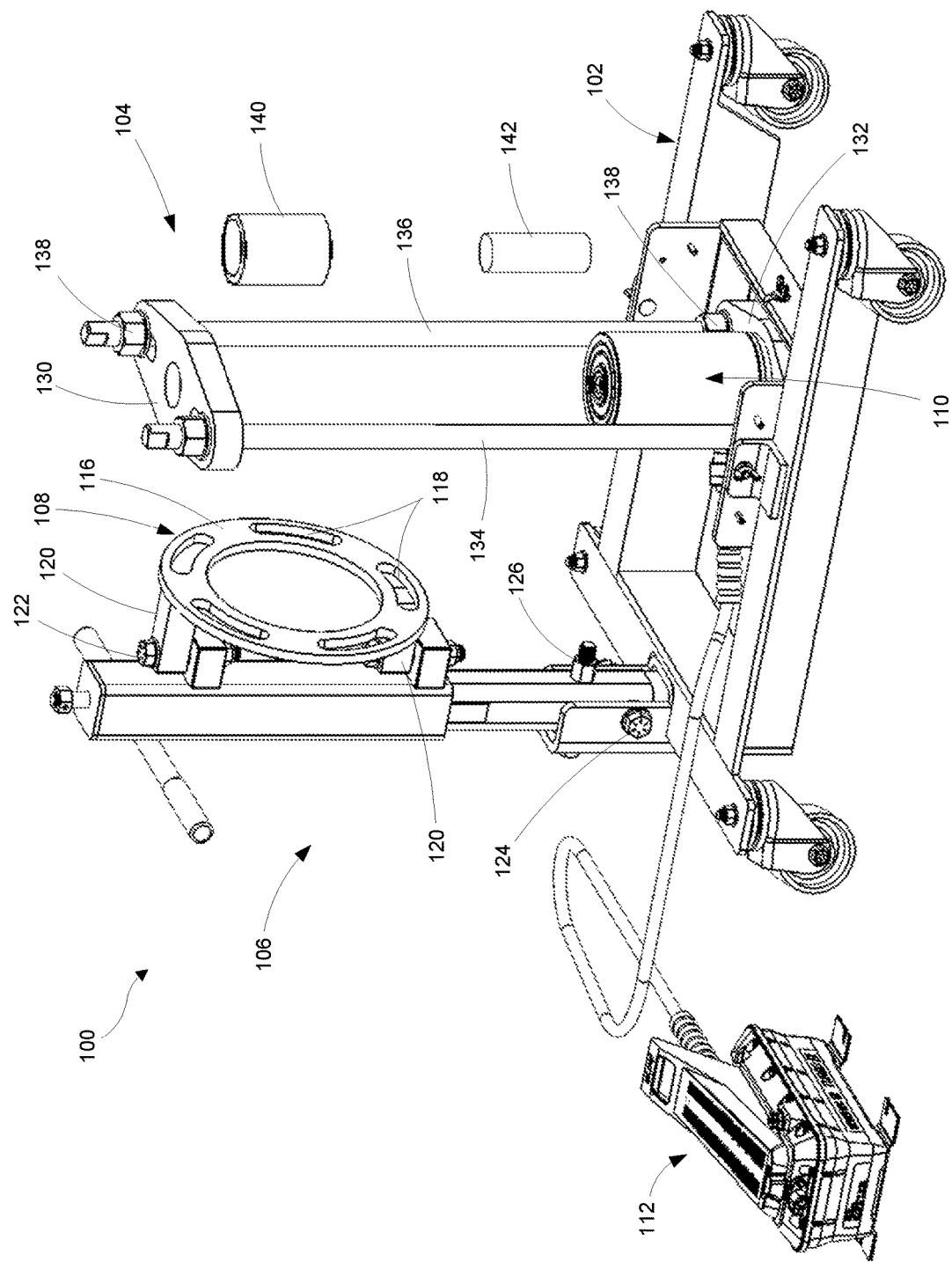
FIG. 3 is an isometric view of a steering axle kingpin removal system configured in accordance with a representative embodiment of the present technology.

The steering axle kingpin removal systems disclosed herein provide a low cost, reliable method of removing the kingpin from a steer axle. The disclosed systems are designed to carry the weight of the wheel end assembly once it is free from the axle, thereby eliminating the need to disassemble the wheel end assembly. FIG. 3 illustrates a steering axle kingpin removal system 100 according to a representative embodiment. The kingpin removal system 100 includes a cart assembly 102 that supports a yoke assembly 104, a hub mounting ring 108, and a wheel end support mechanism 106. The yoke assembly 104 works in conjunction with a hydraulic press 110 powered by a portable pump 112 in this embodiment. In other embodiments, other types of presses and other types of pumps are possible.

The hub mounting ring 108 includes a ring 116 with a plurality of apertures 118 configured to receive the wheel studs 16 (FIG. 1). In some embodiments, the apertures 118 are slotted to accommodate different bolt patterns. A pair of arms 120 extend from the ring 116 and pivotably attach to the wheel end support mechanism 106 with suitable fasteners, such as nut and bolt assemblies 122. In some embodiments, the hub mounting ring 108 comprises a weldment of the ring 116 and arms 120. The hub mounting ring 108 pivots about a vertical axis with respect to the wheel end support mechanism 106 to facilitate alignment of the hub mounting ring 108 with the hub 14 and wheel studs 16 (FIG. 1). The wheel end support mechanism 106 can pivot about a horizontal axis with respect to the cart assembly 102 to further facilitate aligning the wheel studs 16 (FIG. 1) with the hub mounting ring 108. In some embodiments, the wheel end support mechanism 106 pivots on suitable hardware, such as nut and bolt assembly 124. Thus, the wheel end support mechanism 106 and the hub mounting ring 108 each pivot about corresponding orthogonal axes defined by nut and bolt assemblies 122 and 124. In some embodiments, the angle at which the wheel end support mechanism 106 is pivoted can be adjusted with suitable hardware, such as nut and bolt assembly 126. The wheel end assembly 10 (FIG. 1) can be secured to the hub mounting ring 108 by using the wheel's lug nuts and wheel studs 16. Also, in order to setup the correct lash between the spindle bearing and spindle it is sometimes necessary to install shims. The wheel end support mechanism 106 facilitates positioning the wheel end assembly 10 during the installation of the kingpin, bearing and shims.

The yoke assembly 104 includes two plates 130/132 and a pair of threaded rods 134/136, which can be placed around the steering spindle 12 (FIG. 2). When the yoke assembly 104 is positioned around the steering spindle 12 the hydraulic press 110, which is a hydraulic ram, is positioned so that its force can be directed against the kingpin 32. The position of the yoke plates 130/132 can be adjusted relative to each other by moving locking nuts 138 as necessary. In some embodiments, the system 100 includes adapters to facilitate pressing the kingpin 32 from the steering spindle 12 (FIG. 2). For example, a mandrel 142 can be positioned between the hydraulic press 110 and the kingpin 32 and a collar 140 can be positioned between the upper spindle arm 20 (FIG. 1) and the upper yoke plate 130. Different diameters, lengths, and configurations of adapters can be used to accommodate various steering spindle designs. Similarly, different yoke plate configurations can be used to accommodate various wheel end assembly designs. For example, in some embodiments, the upper yoke plate 130 can be sized and configured to provide clearance for various components of the wheel end assembly, such as a brake drum backing plate.

Figure 4:
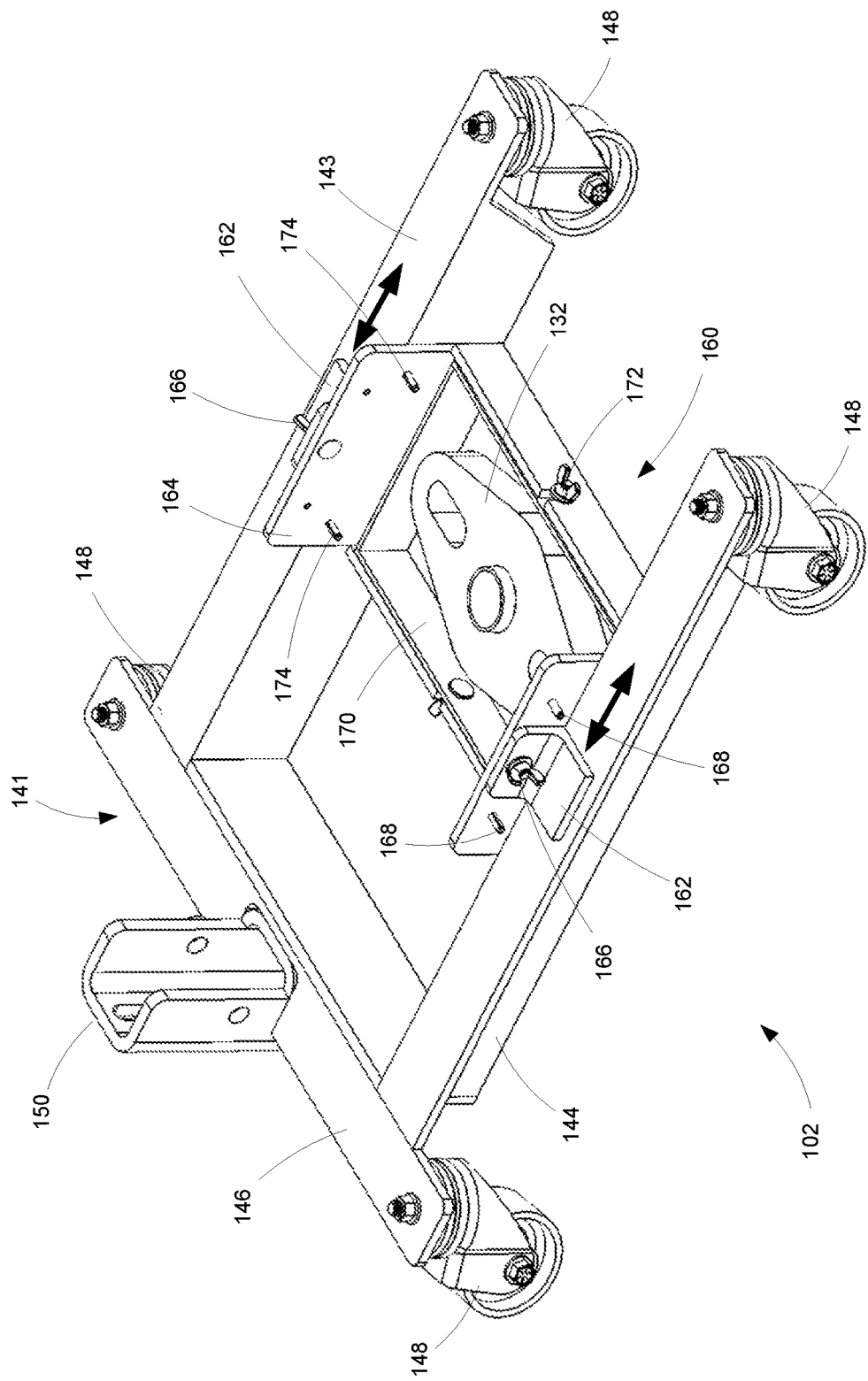
FIG. 4 is an isometric view of the cart assembly shown in FIG. 3.

As shown in FIG. 4, the cart assembly 102 includes a cart weldment 141 comprised of a pair of longitudinal beams 143 and 144 connected by a transverse beam 146. The cart weldment 141 also includes a support mechanism clevis 150 extending upwardly from the transverse beam 146. A plurality of wheels, such as casters 148, are positioned on the cart assembly 102 to facilitate moving the kingpin removal system 100.

The yoke assembly 104 (FIG. 3) reacts against the force generated by the hydraulic press 110 (FIG. 3) and so is necessarily large and heavy. To support its weight and to assure proper alignment, the cart assembly 102 includes a unique gimbal assembly 160 that holds the combined yoke assembly 104 and hydraulic press 110 (FIG. 3). The gimbal assembly 160 also is able to articulate so that the force generated by the hydraulic press 110 is applied squarely on the bottom face of the kingpin 32 thus maximizing the effect of the applied force.

The gimbal assembly 160 includes a gimbal chassis 164 supported on the longitudinal beams 143/144 by angle brackets 162. The angle brackets 162 can be moved back and forth along the longitudinal beams 143/144, as indicated, in order to position the yoke assembly 104 relative to the hub mounting ring 108 (FIG. 3). The gimbal chassis 164 pivots on mounting hardware, such as carriage bolt/wing nut assemblies 166. In order to prevent the yoke assembly 104 from tipping over when not in use, the gimbal chassis 164 includes stop pins 168 that abut the longitudinal beams 143/144 when the gimbal chassis 164 is pivoted. The gimbal chassis 164 supports a yoke tray 170 via mounting hardware, such as carriage bolt/wing nut assemblies 172. Therefore, the yoke tray 170 can pivot with respect to the gimbal chassis 164 until it confronts tray stop pins 174 extending from the gimbal chassis 164. The lower yoke plate 132 is positioned in the yoke tray 170. It should be appreciated that the yoke tray 170 and gimbal chassis 164 pivot about orthogonal axes.

Figure 5:
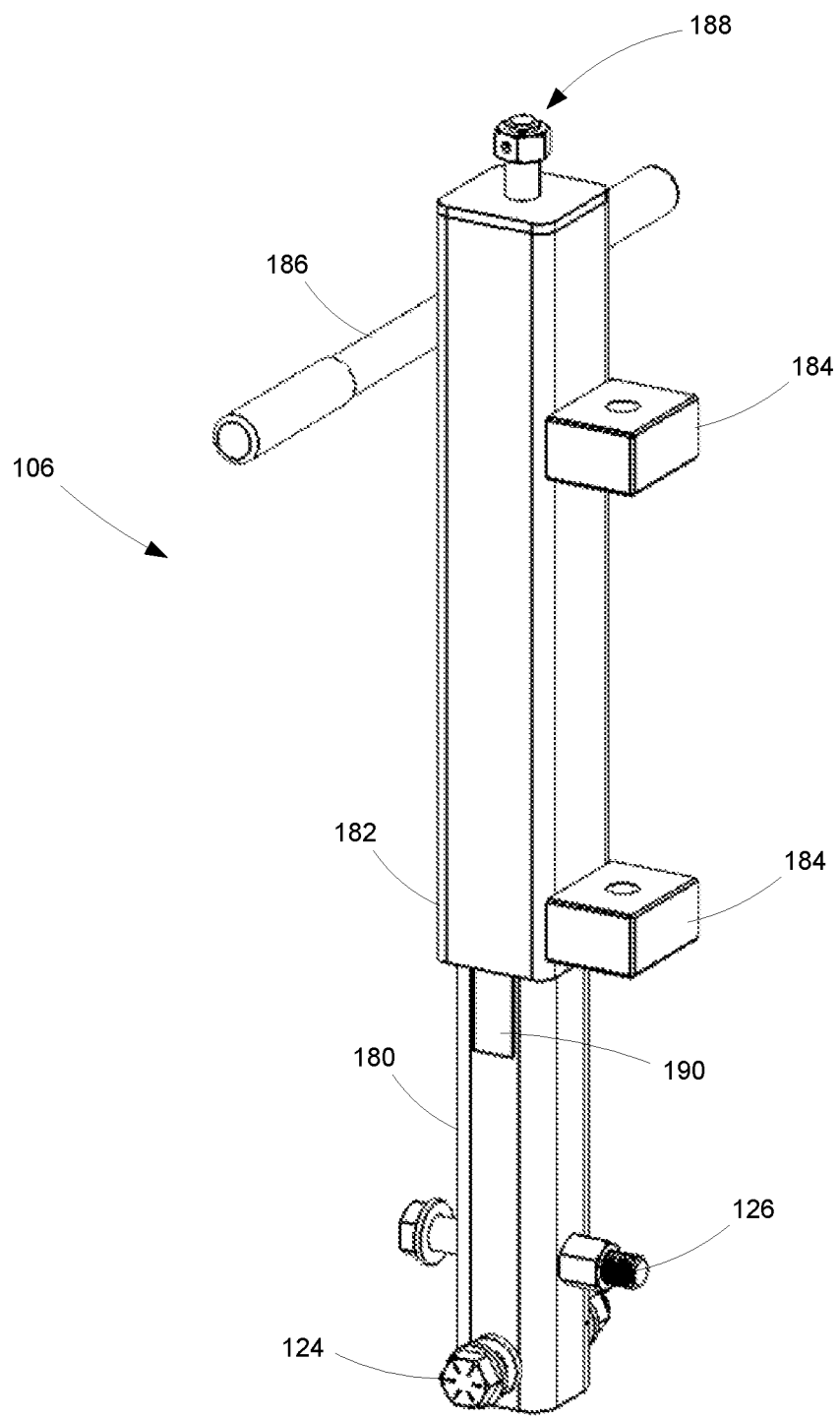
FIG. 5 is an isometric view of the wheel end support mechanism shown in FIG. 3.
Figure 6:
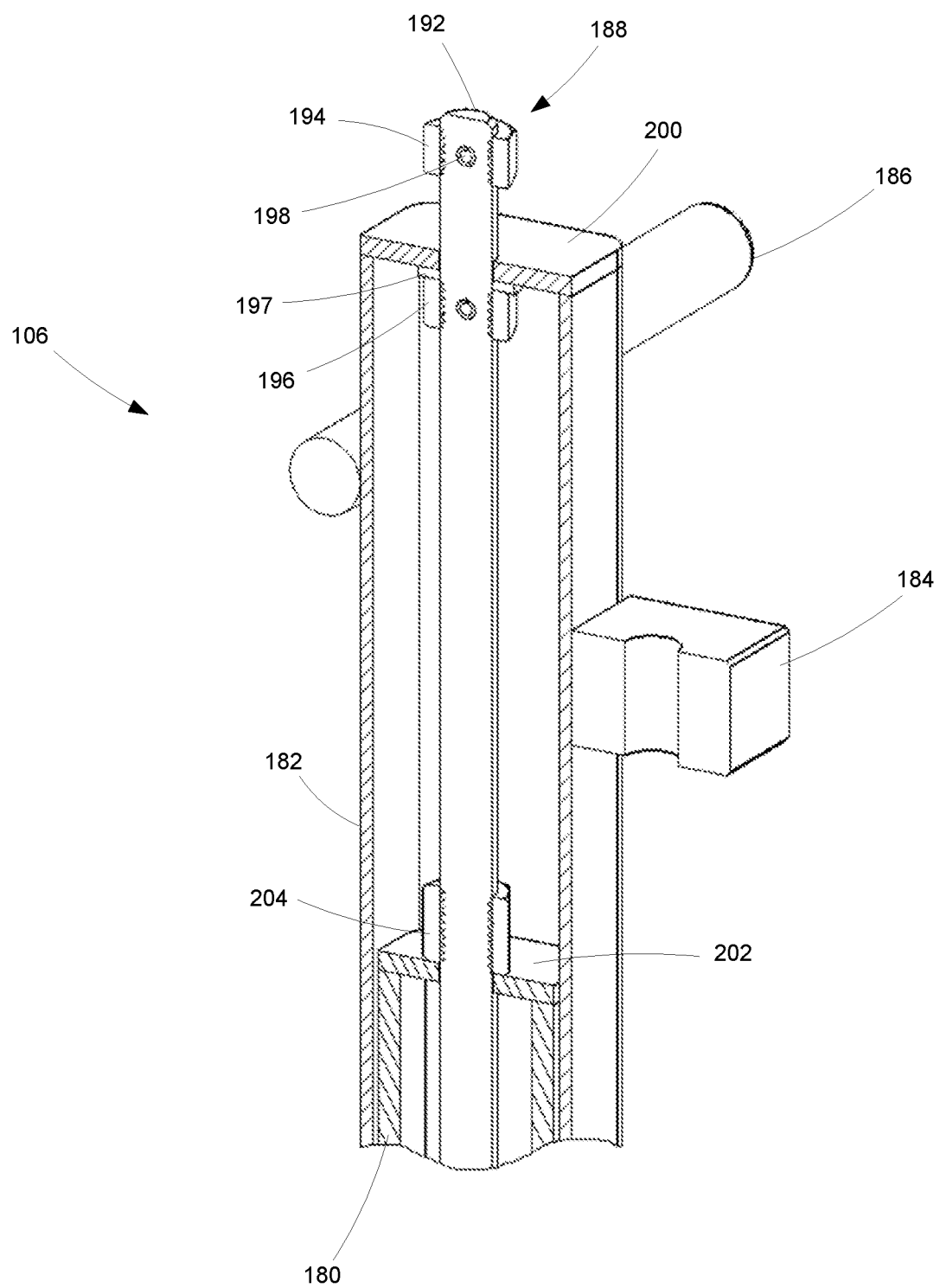
FIG. 6 is a partial cross-section of the wheel end support mechanism shown in FIG. 5.

As shown in FIG. 5, the wheel end support mechanism 106 includes a strut tube 180 with a lift tube 182 positioned over the strut tube 180 for telescopic movement therebetween. The strut tube 180 and the lift tube 182 may be reversed such that the lift tube 182 is positioned in the strut tube 180. In some embodiments, one or more bearings, such as plastic strip 190, are positioned between the tubes to facilitate sliding movement. The lift tube 182 includes mounting tabs 184 positioned to receive the hub support ring 108 (FIG. 3). A handle 186 is attached to the lift tube 186 to facilitate moving the kingpin removal system 100 around on the casters 148 (FIG. 4). The lift tube 182 is moved up and down on strut tube 180 by lifting mechanism 188. As the lift tube 182 is moved up and down, the hub support ring 108 is also moved to facilitate positioning the hub support ring with respect to a wheel end assembly 10. With further reference to FIG. 6, the lifting mechanism 188 includes a threaded lift rod 192 that threads into jack nut 204. Jack nut 204 is attached (e.g., welded) to an end cap 202 of strut tube 180. Accordingly, the lift rod 192 moves up or down with respect to the strut tube 180 as the lift rod 192 is rotated counter-clockwise or clockwise, respectively. An end cap 200 of the lift tube 182 is supported on a lift nut 196 fixed on lift rod 192. Therefore, as the lift rod 192 moves up or down, the lift tube 182 moves up or down with it. In some embodiments, a thrust washer or thrust bearing 197 is positioned between the lift nut 196 and the end cap 200. In some embodiments, the lift mechanism 188 includes an actuator nut 194 fixed to the lift rod 192 to facilitate turning the lift rod 192 with a wrench, for example. In some embodiments, the actuator nut 194 and the lift nut 196 are fixed to the lift rod 192 with suitable hardware, such as pin 198. In some embodiments, the pin 198 can be a steel split pin, for example. In some embodiments, the pin 198 can comprise brass or other suitable material to function as a shear pin to limit the load or weight on the cart. For example, in some embodiments the shear pin can be designed to limit the load to approximately 450 pounds.

Figure 7:
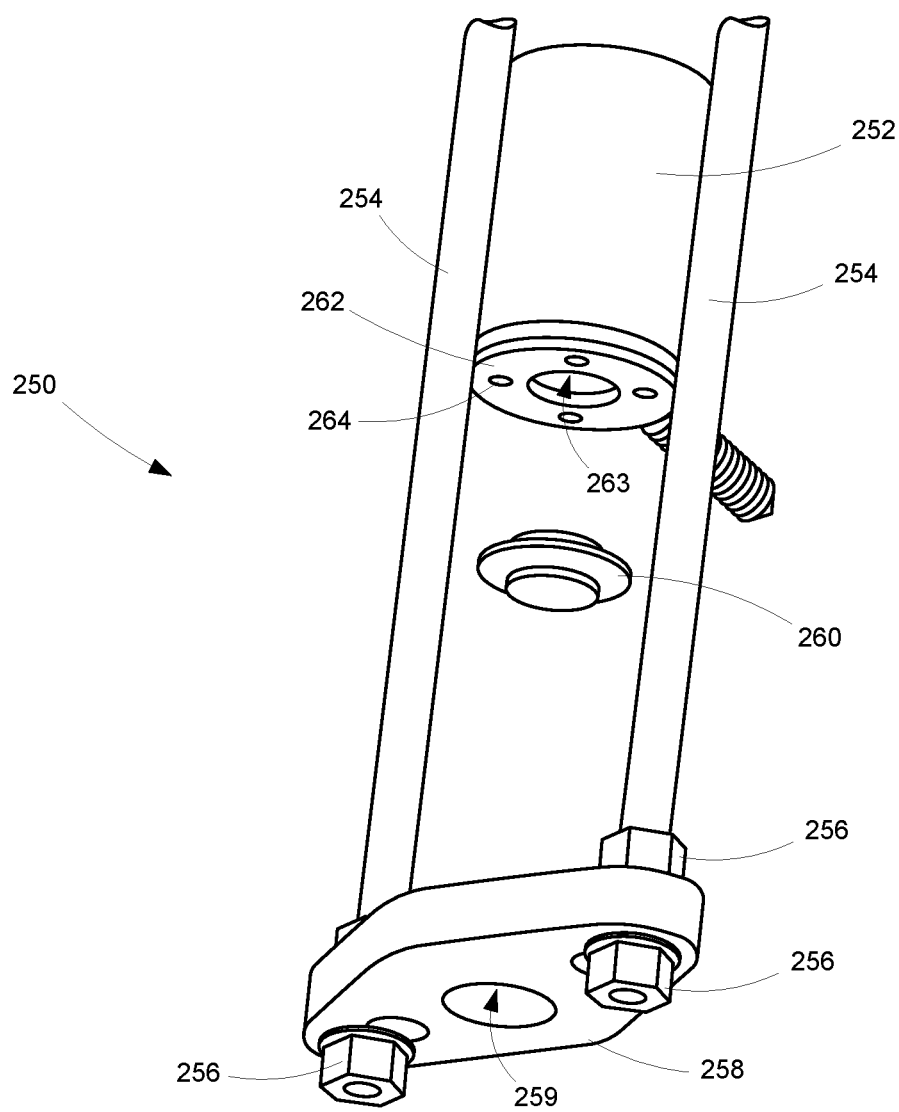
FIG. 7 is a partial isometric view of a yoke assembly according to a representative embodiment.
Figure 8:
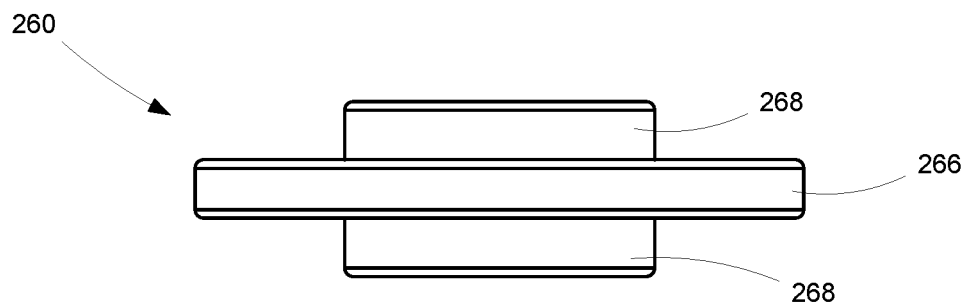
FIG. 8 is a side view of a cylinder plug spacer introduced in FIG. 7.

In some embodiments, a yoke assembly 250 can be used independently of the cart assembly (FIG. 4), as illustrated in FIG. 7. Yoke assembly 250 can be similar to the yoke assembly 104 described above. For example, the yoke assembly 250 can include two plates, such as plate 258, and a pair of threaded rods 254, which can be placed around the steering spindle 12 (FIG. 2). The position of the yoke plates 258 can be adjusted relative to each other by moving locking nuts 256 as necessary. In order to facilitate using the yoke assembly 250 independently of the cart assembly, the yoke assembly 250 can include a centering spacer 260 and a centering ring 262. The centering ring 262 can be attached to the hydraulic press 252 with any suitable fastener, such as screws 264. With further reference to FIG. 8, the centering spacer 260 includes a cylindrical plate 266 with concentric cylindrical stubs 268 extending from opposite sides of the plate 266. The stubs 268 can be sized and configured to engage corresponding apertures 263 and 259 formed in the centering ring 262 and the lower yoke plate 258, respectively. Accordingly, the centering spacer 260 can help retain the press 252 in position on the yoke plate 258 during operation. In some embodiments, the centering spacer 260 and the centering ring 262 can be machined from a suitable material, such as steel, aluminum, or the like.

Figure 9:
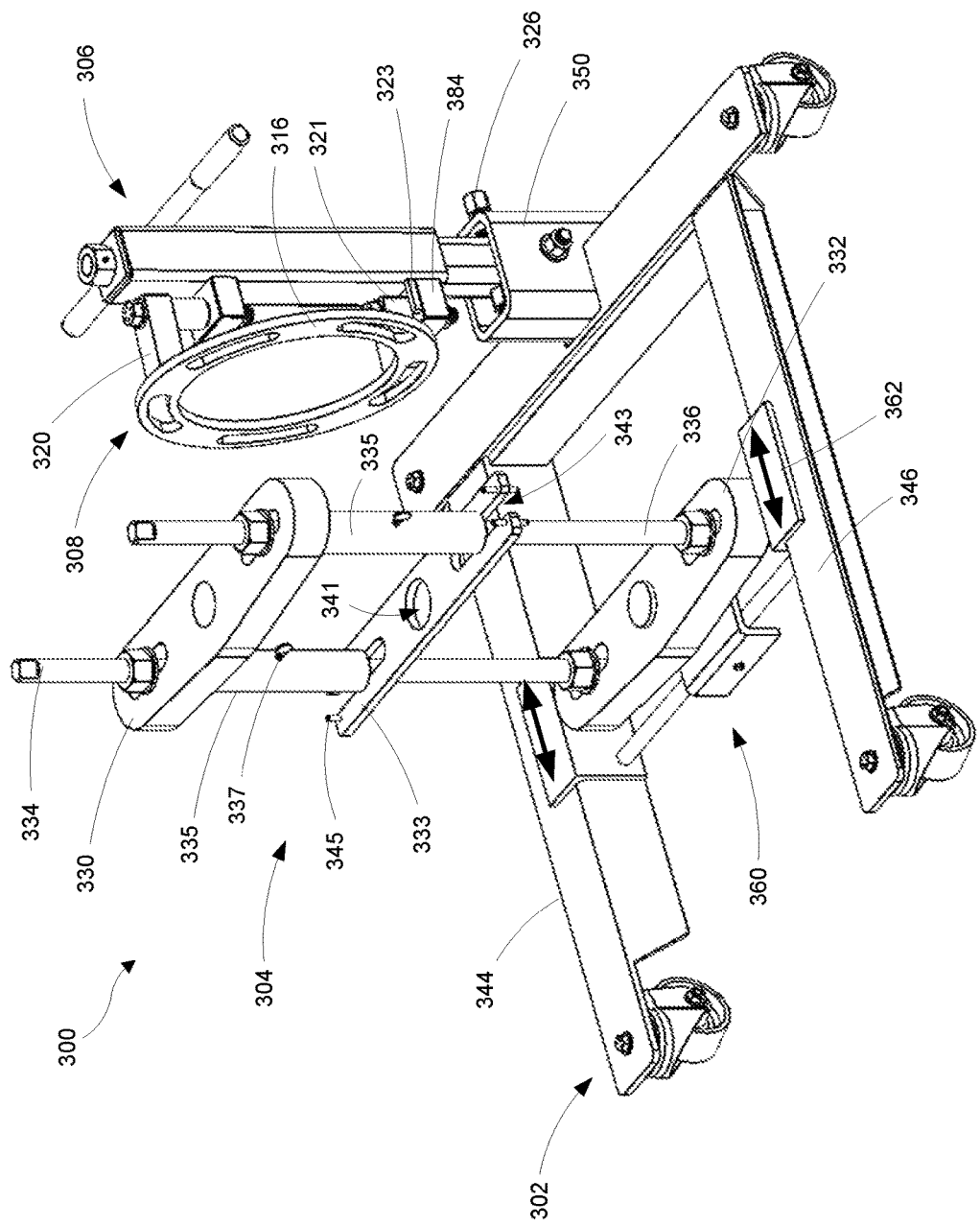
FIG. 9 is an isometric view of a steering axle kingpin removal system configured in accordance with a representative embodiment of the present technology.

FIG. 9 illustrates a steering axle kingpin removal system 300 according to a representative embodiment. The kingpin removal system 300 includes a cart assembly 302 that supports a yoke assembly 304, a hub mounting ring 308, and a wheel end support mechanism 306. The yoke assembly 304 works in conjunction with a press, such as the hydraulic press 110 powered by a portable pump 112 shown in FIG. 3. In other embodiments, other types of presses and other types of pumps are possible.

The hub mounting ring 308 can be constructed as explained above with respect to hub mounting ring 108, including a ring 316 and upper and lower arms 320 and 321, respectively, extending from the ring for pivoting attachment to the wheel end support mechanism 306.

The hub mounting ring 308 pivots about a vertical axis with respect to the wheel end support mechanism 306 to facilitate alignment of the hub mounting ring 308 with the hub 14 and wheel studs 16 (FIG. 1). The wheel end support mechanism 306 can include one or more rotation limiters positioned on either side of the lower arm 321, for example. In some embodiments, the limiters can be a pair of blocks 323 attached (e.g., welded) to mounting tab 384. The blocks 323 limit the rotation of the hub mounting ring 308 about the vertical axis to prevent excess side to side movement of the hub 14 which could otherwise cause the kingpin removal system 300 to become unstable. The wheel end support mechanism 306 can otherwise be constructed as explained above with respect to the wheel end support mechanism 106.

The wheel end support mechanism 306 can pivot about a horizontal axis with respect to the cart assembly 302 to further facilitate aligning the wheel studs 16 (FIG. 1) with the hub mounting ring 308. The wheel end support mechanism 306 attaches to a support mechanism clevis 350 mounted to the cart assembly 302. In this embodiment, the support mechanism clevis 350 is in the form of a tube rather than the channel of the clevis 150 described above with respect to FIG. 4. This arrangement allows for the tilt bolt 326 to rest against an inner face of the tube instead of the full load being solely supported by the threads of bolt 326. The cart assembly 302 can otherwise be constructed as explained above with respect to the cart assembly 102.

The yoke assembly 304 can be constructed as explained above with respect to yoke assembly 104. In addition, an intermediate yoke plate 333 along with support tubes 335 can be positioned between the upper and lower yoke plates 330 and 332, respectively. The intermediate yoke plate 333 can facilitate positioning a hydraulic press above the axle for certain applications, as explained more fully below with respect to FIGS. 12 and 13. The intermediate yoke plate 333 and support tubes 335 can help support, stabilize, and/or align the upper and lower yoke plates 330/332 during the process of installing the yoke assembly 304 on a steering spindle. Each support tube 335 can include a fastener, such as thumb screw 337, to secure the support tube in position along the yoke assembly 304.

The intermediate yoke plate 333 can include a central opening 341 for receiving a collar or guide, such as guide 140 (FIG. 3), which can be positioned between the upper spindle arm 20 (FIG. 1) and the intermediate yoke plate 333. The intermediate yoke 333 can rest on the upper spindle arm 20 to help support the weight of the yoke assembly 304. A slot 343 can be formed on each end of the intermediate yoke 333 to receive a corresponding threaded rod 334/336 therein. A pair of pins 345 are positioned at the entrance of each slot to engage the support tubes, thereby preventing the threaded rods 334/336 from sliding out the ends of corresponding slots 343.

The yoke assembly 304 reacts against the force generated by the hydraulic press 110 (FIG. 3) and so is necessarily large and heavy. To support its weight and to assure proper alignment, the cart assembly 302 includes a unique gimbal assembly 360 that holds the combined yoke assembly 304 and hydraulic press 110 (FIG. 3). The gimbal assembly 360 also is able to articulate (e.g., tilt and rotate) so that the force generated by the hydraulic press 110 is applied squarely on the kingpin 32 thus maximizing the effect of the applied force. The gimbal assembly 360 can be supported on the longitudinal beams 344/346 by angle brackets 362. The angle brackets 362 can be moved back and forth along the longitudinal beams 344/346, as indicated, in order to position the yoke assembly 304 relative to the hub mounting ring 308.

Figure 10:
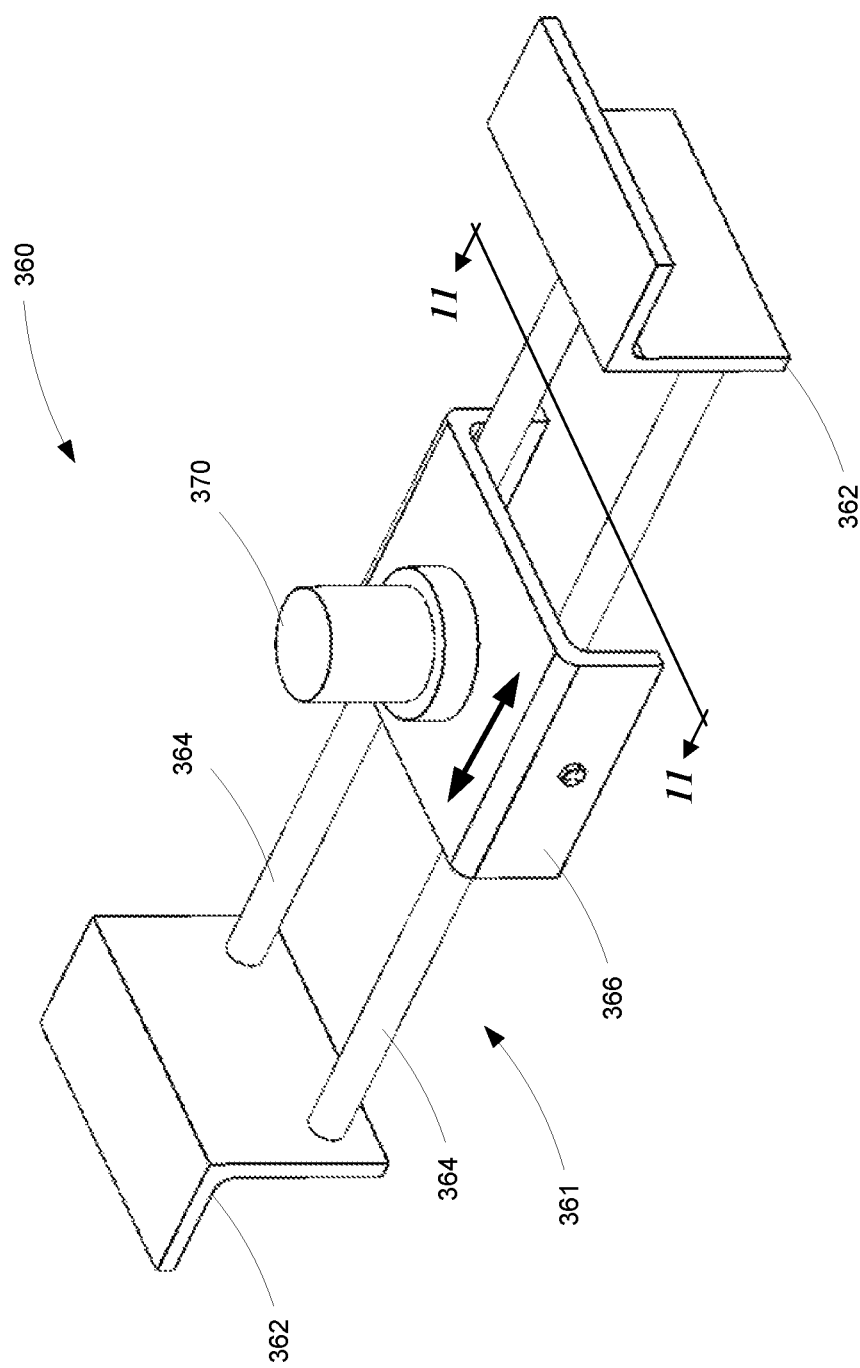
FIG. 10 is an isometric view of a gimbal assembly according to a representative embodiment.

As shown in FIG. 10, the angle brackets 362 can be connected together by one or more elongate bearing elements, such as rods 364 to form a frame 361. In some embodiments, the brackets 362 and rods 364 are secured to each other by welding or by using suitable fasteners. The rods 364 support a gimbal carriage 366. In some embodiments, the gimbal carriage 366 comprises a length of channel that can slide back and forth on the rods 364 as indicated. The gimbal carriage 366 carries a gimbal pin 370 that extends through the lower yoke plate 332 (FIG. 9).

Figure 11:
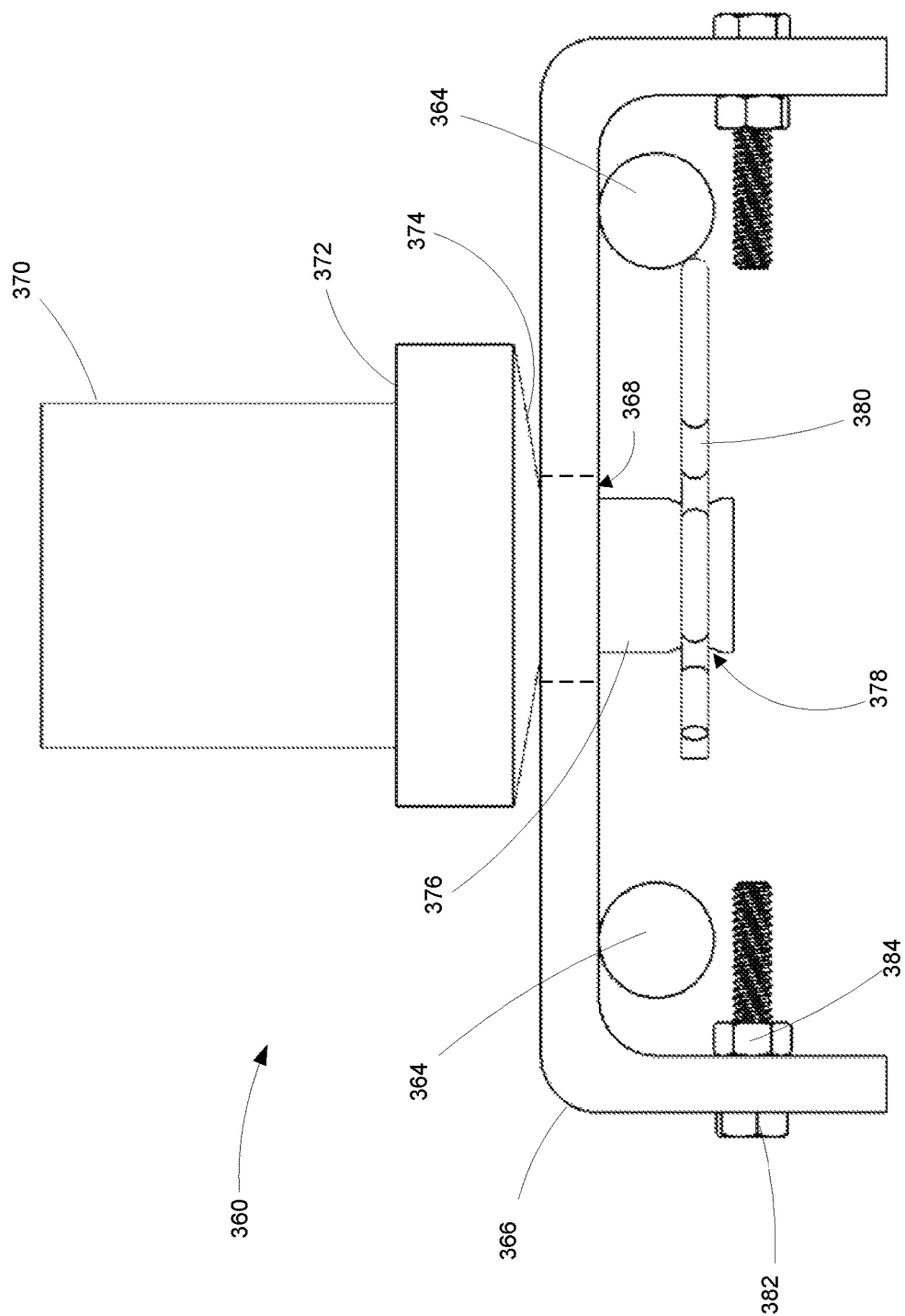
FIG. 11 is a cross-sectional sideview of the gimbal assembly shown in FIG. 10 taken about line 11-11.

With further reference to FIG. 11, the gimbal carriage 366 can be captured or retained on the bearing rods 364 by suitable fasteners, such as cap screws 382 and nuts 384. The cap screws extend through holes (not shown) that are spaced away from the bearing rods 364. Accordingly, there is a gap between the cap screws 382 and the bearing rods 364 which provides clearance for movement of the gimbal carriage 366 relative to the bearing rods 364.

The gimbal pin 370 includes a shoulder 372 upon which the lower yoke plate 332 can rest. Opposite the shoulder 372 is a frustoconical surface 374, which allows the gimbal pin 370 to incline or tilt in any direction (i.e., gimbal) relative to the gimbal carriage 366. The gimbal pin 370 also includes a mounting stud 376 positioned to extend through a mounting hole 368 formed through the gimbal carriage 366. The mounting hole 368 is sized large enough to provide clearance for the mounting stud 376 to freely move within the mounting hole 368 as the gimbal pin 370 tilts. The gimbal pin 370 is retained on the gimbal carriage 366 by a suitable fastener, such as a cotter pin or hitch pin 380 extending through transverse bore 378. The transverse bore 378 and the hitch pin 380 are spaced away from a lower surface of the carriage to provide clearance for the gimbal pin to tilt.

Figure 12:
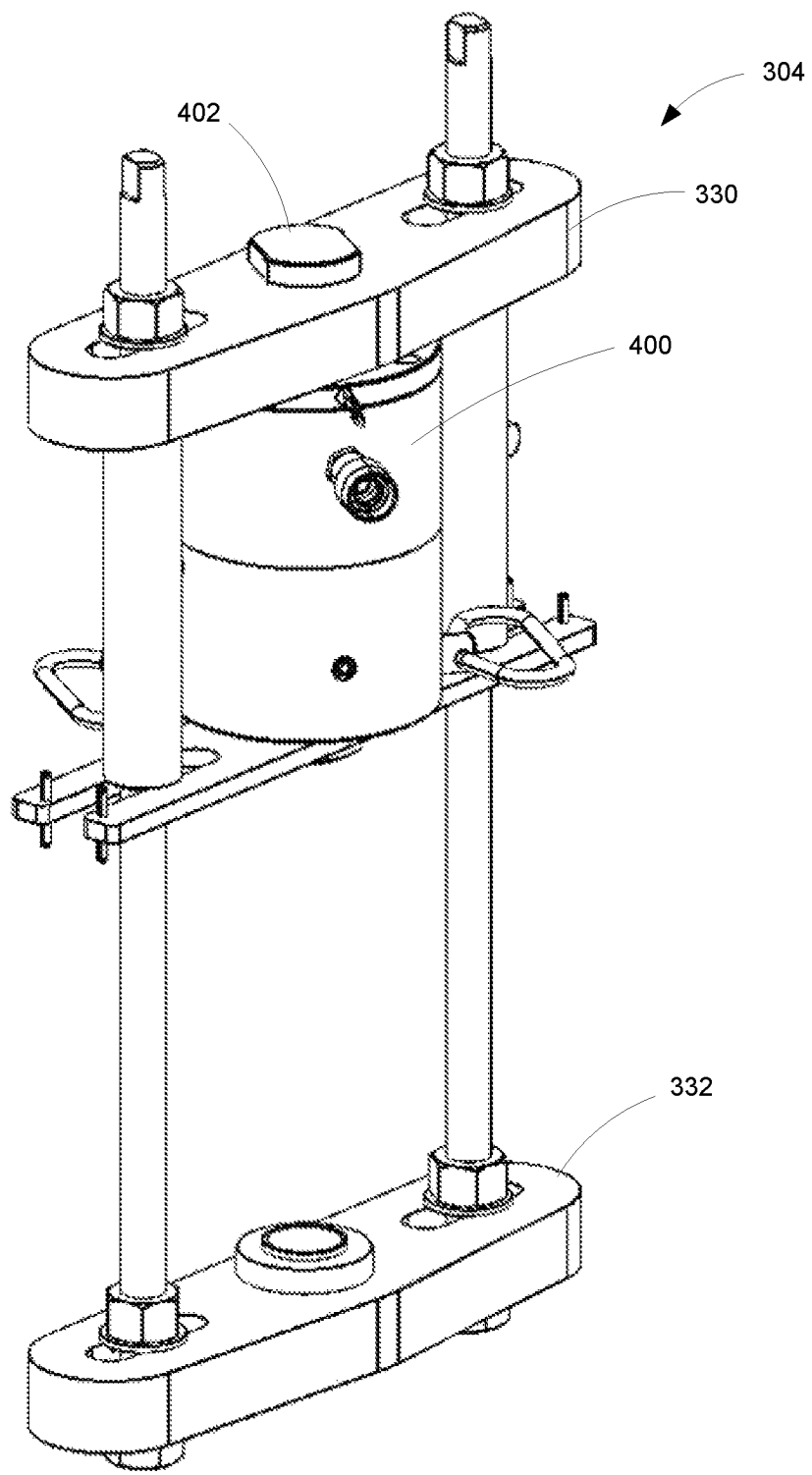
FIG. 12 is an isometric view of the yoke assembly shown in FIG. 9 configured with a hydraulic press carried by the upper yoke plate.
Figure 13:
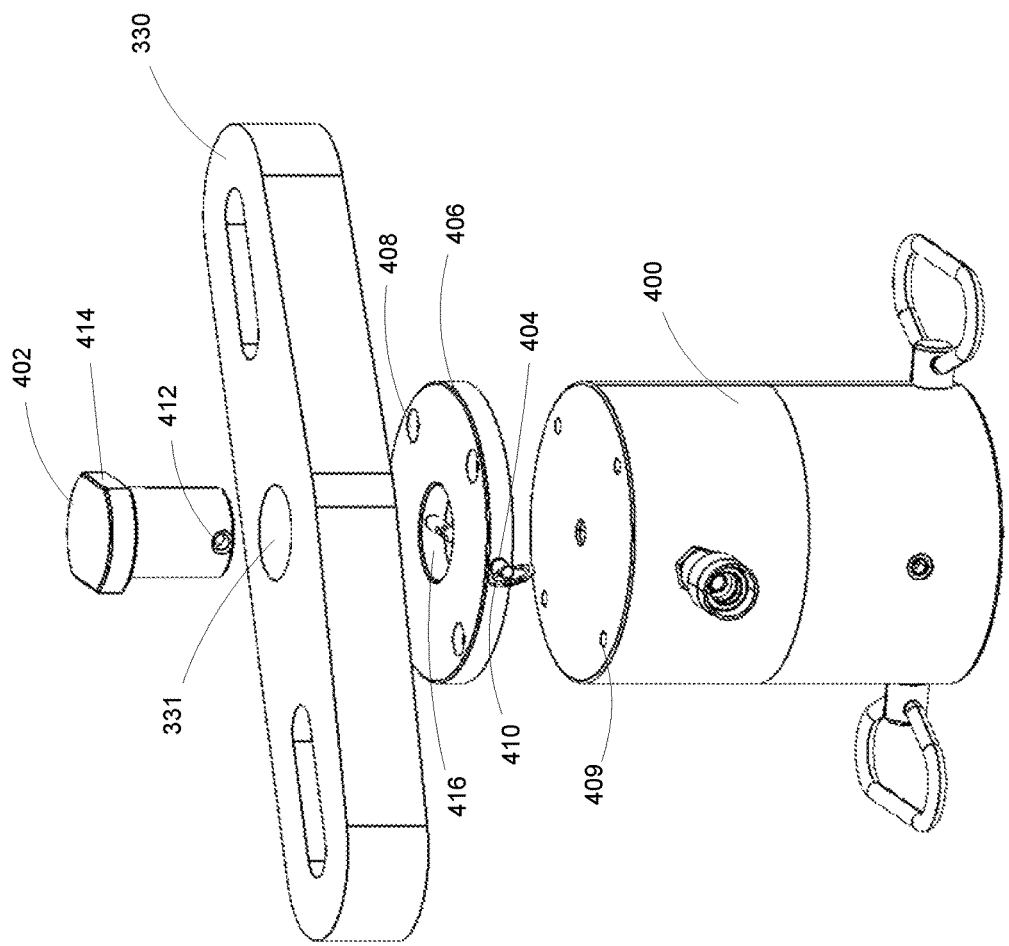
FIG. 13 is an exploded isometric view illustrating attachment of the hydraulic cylinder to the upper yoke plate.

FIG. 12 shows the yoke assembly 304 configured with a hydraulic press 400 carried by the upper yoke plate 330. The hydraulic press 400 can be positioned on the upper yoke plate 330 for applications (e.g., transit buses) where there is minimal clearance below the steering spindle requiring the king pin to be pushed from the top. The hydraulic press 400 is attached to the upper yoke plate 330 with a mounting pin 402. With further reference to FIG. 13, the mounting pin 402 can extend through a central opening 331 formed through the upper yoke plate 330. The mounting pin 402 can include a transverse bore 412 positioned to receive one or more retainer pins 410. In some embodiments, an adapter plate 406 can be mounted to the hydraulic press 400 with suitable fasteners (not shown) extending through mounting holes 408 and into corresponding threaded bores 409 located on the hydraulic press 400. The adapter plate 406 can include a central opening 416 sized to receive the mounting pin 402. Once the mounting pin 402 is inserted into the central opening 416 the retainer pins 410 can be inserted through cross-bores 404 into the transverse bore 412 to retain the hydraulic press 400 on the upper yoke plate 330. The mounting pin 402 can include flats 414, or other indicators, positioned on the head of the pin that are aligned with the transverse bore 412 to facilitate aligning the cross-bores 404 with the transverse bore 412.

Also disclosed herein are methods for removing and replacing a steering axle kingpin from a vehicle. In an embodiment, the method comprises jacking the vehicle up so that its weight is no longer on the axle 30. Remove the wheel and any kingpin locking pins and upper and lower end caps from the steering spindle 12. Replace the end caps with the tool's alignment adapters, such as mandrel 142 and collar 140. Position the steering axle kingpin removal system 100 up against the wheel end assembly 10 and connect it to the hub mounting ring 108 using the wheel's lug nuts. The yoke assembly 104 can then be assembled around the steering spindle 12 and the hydraulic press 110 can then be placed against the bottom of the kingpin 32 and pressurized so that it starts to push against the kingpin 32. In some embodiments, the hydraulic press 400 can be positioned against the top of the kingpin 32. Once the kingpin 32 has been removed it is possible to move the cart 102 to the side thus sliding the wheel end assembly 10 clear of the axle for inspection. Once the technician is ready to install a new kingpin 32', the technician simply pushes the cart back so that the wheel end assembly 10 is repositioned back over the axle 30. The technician can then install the new kingpin 32' from the top of the spindle.

In some embodiments, the design of the adapters can be changed to suit the specific geometry of different steering spindles for different vehicles. In some embodiments, the reach and height adjustment of the cart can be changed to accommodate variations in the size of the axle being repaired or the power of the hydraulic press used to push out the kingpins. Although the illustrated embodiments are directed to remove kingpins from the front steer axles of a heavy truck, it is also possible to apply the disclosed technology to remove the kingpins from self-steering axles at the rear of the truck or any installed on a trailer.

In some embodiments, a representative kingpin removal system can include a cart assembly having one or more wheels and a yoke assembly carried by the cart assembly and positionable around a steering spindle of a wheel end assembly. In some embodiments, the yoke assembly can include a pair of yoke plates interconnected by a pair of rods. An intermediate plate can be positioned between the pair of yoke plates. A wheel end support mechanism can be pivotably coupled to the cart assembly and a hub mounting ring can be pivotably coupled to the wheel end support mechanism. The hub mounting ring can be positioned to connect to and support the wheel end assembly. In some embodiments, a press is positionable on one of the pair of plates between the pair of rods and is operable to push against a kingpin of the wheel end assembly. In some embodiments, a pair of support tubes, can each be positioned on a corresponding one of the pair of rods and between the intermediate plate and one of the pair of yoke plates. In some embodiments, the cart assembly includes a gimbal assembly positioned to support the yoke assembly. In some embodiments, a gimbal assembly can include a frame slidably positioned on the cart assembly, a gimbal carriage retained on the frame, and a gimbal pin carried by the gimbal carriage. In some embodiments, the wheel end support mechanism can include a strut tube, a lift tube, and a lifting mechanism positioned to move the lift tube relative to the strut tube. In some embodiments, the wheel end support mechanism and the hub mounting ring each pivot about corresponding orthogonal axes.

In some embodiments, a representative method for removing a steering spindle kingpin from a vehicle axle can comprise removing a wheel from a corresponding wheel end assembly; connecting a wheel end support mechanism to the wheel end assembly; positioning a yoke assembly around a steering spindle of the wheel end assembly; positioning an intermediate plate on the yoke assembly; positioning a press between the yoke assembly and a kingpin of the wheel end assembly; removing the kingpin from the steering spindle using at least the press; and moving the wheel end support mechanism and wheel end assembly away from the vehicle axle, thereby disengaging the steering spindle from the vehicle axle. In some embodiments, the method further comprises positioning an adapter between the steering spindle and the yoke assembly. In some embodiments, the method further comprises positioning a mandrel between the kingpin and the press. In some embodiments, the method further comprises moving the wheel end support mechanism and wheel end assembly toward the vehicle axle to engage the steering spindle with the vehicle axle. In some embodiments, the method further comprises installing a new kingpin through the steering spindle and the vehicle axle. In some embodiments, these steps are not necessarily performed in the order(s) recited above.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A kingpin removal system, comprising: a cart assembly including one or more wheels and a gimbal assembly, the gimbal assembly including a gimbal pin having a frustoconical surface configured to tilt in any direction; a yoke assembly carried by the gimbal assembly and positionable around a steering spindle of a wheel end assembly, the yoke assembly including a pair of yoke plates interconnected by a pair of rods; an intermediate plate positioned between the pair of yoke plates; a wheel end support mechanism carried by the cart assembly; and a hub mounting ring carried by the wheel end support mechanism, the hub mounting ring being positioned to connect to and support the wheel end assembly.

2. The system of claim 1, further comprising a press positionable on one of the pair of yoke plates between the pair of rods and operable to push against a kingpin of the wheel end assembly.

3. The system of claim 1, further comprising a pair of support tubes, each positioned on a corresponding one of the pair of rods and between the intermediate plate and one of the pair of yoke plates.

4. The system of claim 1, wherein the wheel end support mechanism is pivotably coupled to the cart assembly.

5. The system of claim 1, wherein the hub mounting ring is pivotably coupled to the wheel end support mechanism.

6. The system of claim 1, wherein the wheel end support mechanism includes a strut tube, a lift tube, and a lifting mechanism positioned to move the lift tube relative to the strut tube.

7. A kingpin removal system, comprising: a cart assembly including one or more wheels; a gimbal assembly including: a frame slidably positioned on the cart assembly a gimbal carriage retained on the frame; and a gimbal pin having a frustoconical surface, configured to tilt in any direction relative to the gimbal carriage, carried by the gimbal carriage; a yoke assembly carried by the gimbal pin and positionable around a steering spindle of a wheel end assembly, the yoke assembly including a pair of plates interconnected by a pair of rods; a wheel end support mechanism pivotably coupled to the cart assembly; and a hub mounting ring pivotably coupled to the wheel end support mechanism, the hub mounting ring being positioned to connect to and support the wheel end assembly.

8. The system of claim 7, further comprising a press positionable on one of the pair of plates between the pair of rods and operable to push against a kingpin of the wheel end assembly.

9. The system of claim 7, wherein the wheel end support mechanism includes a strut tube, a lift tube, and a lifting mechanism positioned to move the lift tube relative to the strut tube.

10. The system of claim 7, wherein the wheel end support mechanism and the hub mounting ring each pivot about corresponding orthogonal axes.

* * * * *